United States Patent Office 2,772,200
Patented Nov. 27, 1956

2,772,200

COMPOSITION CONTAINING COPPER SALTS OF FLUORINE AND ARSENIC FOR PROTECTING WOOD AND OTHER FIBROUS MATERIALS

Murray Zakheim, Philadelphia, Pa., assignor to The Pennsylvania Salt Manufacturing Company, Philadelphia, Pa., a corporation of Pennsylvania No Drawing. Application June 29, 1951,
Serial No. 234,478

10 Claims. (Cl. 167—38.5)

This invention relates to pesticide compositions and more particularly to compositions suitable for forming aqueous impregnating solutions for depositing copper salts of fluorine and arsenic in wood and other fibrous materials for protecting the same against attack by harmful organisms including fungi, marine bores, insects and microorganisms.

The fluorine and arsenic salts of copper have been found to be particularly suitable for the purpose of preserving wood, these compounds giving excellent protection against wood destroying organisms including termites. Salts such as copper fluoride, copper arsenite and copper arsenate are insoluble in water to any appreciable degree and thus offer greater protection to wood and other fibers impregnated therewith than more soluble compounds where the material treated comes in contact with an excess of water. However, the relative insolubility of these compounds in water, though making their use preferred when once deposited within the fibrous material, makes difficult the preparation of suitable impregnating solutions from which the compounds can be deposited.

Copper salts of fluorine and arsenic have heretofore been deposited in wood and other fibrous materials by first preparing an ammonia solution of these compounds and thereafter impregnating the wood or other fibrous material with the ammonia solution. On drying, ammonia is given off and the copper fluoride, arsenate or arsenite is deposited. The ammonia solution can be prepared either by adding the copper fluoride, copper arsenate, or copper arsenite directly to ammonia or by adding water-soluble or ammonia-soluble salts which will react to form the copper fluoride, arsenate or arsenite. Though copper fluoride, arsenate and arsenite can be deposited in fibers by this process the process is not entirely satisfactory in that: it is too expensive for practical purposes, the fibers are attacked by the ammoniacal copper solution when relatively concentrated solutions are used, and the ammonia vapors produced by the solution make it necessary for workmen to use gas masks and take special precautions for protection against the liquid.

If the ammoniacal solutions are sufficiently diluted with water, the problems of fiber attack, objectionable vapors and precautions for handling are substantially eliminated; however, on any substantial dilution, the copper salts are precipitated out in large part and the solution, as a result, is rendered unsatisfactory for depositing these salts within the fibrous materials.

In order to permit substantial water dilutions of the copper fluoride, arsenate and arsenite aqueous ammonia solutions, it has been suggested to add a hydroxyamine such as triethanolamine, which was found to have a marked stabilizing effect on the copper ammonium compounds permitting their dilution to any desired degree without precipitating the copper salts. When, however, dried samples of cellulose fibers impregnated with triethanolamine stabilized ammoniacal copper fluoride solutions were compared for their stability against leaching with dried samples of cellulose fibers impregnated with an unstabilized ammoniacal copper fluoride solution, the resistance to leaching of the copper fluoride deposits obtained from the stabilized solution was found to be considerably less than the resistance to leaching of the copper fluoride deposits obtained from the unstabilized copper fluoride ammonium solution.

A further disadvantage to solutions stabilized with hydroxyamines is that after dilution on continued standing some of the copper is found to precipitate out of the solution. Since this only occurs after the dilute solution has been left standing for 3 to 4 days, it presents no particular problem where fresh solutions are prepared and used immediately. However, where it is desired to use the same solution over extended periods of time, as is frequently the case in the impregnation of wood, solutions stabilized with hydroxyamines such as triethanolamine are, after a few days, unsatisfactory since the copper salts precipitating out of the solution will deposit on the surface of the wood treated and not in the wood or the fibers where it gives the best protection.

I have now discovered that ammonium hydroxide solutions of such salts as copper fluoride, copper arsenate and copper arsenite can be diluted to any desired degree without precipitation of the copper if a small amount of an ammonium salt other than an ammonium acid salt is added to the ammoniacal solution of the copper salt. The addition of any amount of soluble ammonium salt will be beneficial with respect to improving the stability of the copper ammonium solutions. However, if it is desired to dilute ammonium hydroxide solutions substantially saturated with copper fluoride to concentrations such that the water to copper ammonium fluoride concentrate ratio is greater than 100 to 1, it is preferred that there be present in the ammoniacal solution of the copper salt at least 3 mols of the soluble ammonium salt added per mol of copper present. In fact, I have found that when the ammonium salt used is ammonium carbonate, dilutions as high as 800 to 1 can be obtained with as little as 3 mols ammonium carbonate per mol of copper.

The copper ammoniacal solutions obtained through the practice of my invention are not only surprisingly stable in that they show substantially no precipitation of copper from extremely dilute solutions even after standing for periods as long as 3 weeks, but the resistance to leaching of the copper fluoride, copper arsenate or copper arsenite deposited in the fibers treated from solutions stabilized by the addition of a small amount of an ammonium salt, is as good as the resistance to leaching of the copper fluoride, arsenate or arsenite deposits obtained from unstabilized ammoniacal solutions of these salts and is substantially superior in resistance to leaching to deposits obtained from ammoniacal solutions stabilized with hydroxyamine compounds. This is clearly illustrated by the following table in which the resistance to leaching of deposits obtained from various solutions are compared:

| Formula | Mg. Cu Impregnated | Mg. Cu After Leaching | Percent Peached | Time of Leaching, hours |
|---|---|---|---|---|
| 1.6 copper ammonia fluoride soln. (16% Cu)[1] 92.9% g. water [2] | 11.6 13.8 | 9.2 9.4 | 20.7 31.9 | 1½ 4 |
| 1.6 g. copper ammonia fluoride soln. (16% Cu) 1.6 g. NH₄Cl 96.8 g. water | 11.5 11.5 | 8.1 7.8 | 29.5 32.2 | 1½ 4 |
| 5.0 g. CuF₂.2H₂O 6.0 g. triethanolamine 9.0 g. conc. NH₄OH (28% NH₃) | 15.8 | 3.0 | 81.0 | 1½ |

[1] 5.5 g. conc. NH₄OH (28% NH₃).
[2] Additional NH₄OH added to permit dilution.

In the compositions of my present invention, I prefer to use concentrates wherein the copper fluoride to ammonium hydroxide is approximately 1 part by weight copper fluoride to 2 parts ammonium hydroxide (28% $NH_3$). To this solution is added approximately 3 to 5 mols of the ammonium salts per mol of copper present in the ammonium hydroxide solution. Excess amounts of the ammonium salts, though uneconomical, are apparently not harmful. The ammonium salt may be added to the ammonium hydroxide before the copper fluoride is dissolved therein or the ammonium salt may be added to the ammoniacal solution of the copper fluoride, arsenate or arsenite. Also, the ammoniacal solution of the copper fluoride, arsenate or arsenite may be prepared by dissolving copper fluoride, copper arsenate or copper arsenite directly in ammonium hydroxide or may be prepared by adding inorganic salts soluble in aqueous ammonia which contain copper and anions such as fluoride, arsenate, or arsenite in the necessary ratios to form the required copper fluoride, copper arsenate or copper arsenite in solution. Soluble fluorides when hereinafter used include those soluble in water and aqueous ammonia solutions.

I prefer to use the ammonium salts: ammonium carbonate, ammonium chloride, ammonium nitrate and ammonium sulfate. As previously stated, however, other ammonium salts can be used. In my preferred compositions the ammonium salts are preferably used in amounts such that 3 to 5 mols of ammonium salt are present for each mol of copper in the ammonium hydroxide solution.

In order to better understand the practice of my invention, attention is called to the following examples. These examples are to be considered as illustrative only, however, and should not be considered as limiting the invention to the particular examples used.

Example 1

3.3 gms. of $CuF_2 \cdot 2H_2O$ where dissolved in 6.7 gms. of concentrated $NH_4OH$ (28% $NH_3$). To this was added 8.0 gms. of $(NH_4)_2CO_3$ and 24.8 gms. water, the water being necessary to completely dissolve the added ammonium carbonate.

This solution was diluted with water to a copper content of .02% and was then left to stand for over two weeks after which period no apparent precipitation of any copper salt was noted.

Example 2

A liquid composition containing 3.3 gms. $CuF_2 \cdot 2H_2O$, 6.7 gms. concentrated $NH_4OH$ (28% $NH_3$), 8.0 gms. $NH_4NO_3$ and 26.0 gms. water was prepared in a manner similar to Example 1.

This solution was diluted with water to a copper content of .2% and allowed to stand for over two weeks. After this time no apparent precipitation of copper salt was noted.

Example 3

A solution containing 2.0 gms. copper arsenate, 8.0 gms. concentrated $NH_4OH$ (28% $NH_3$), 8.0 gms. $NH_4Cl$ and 32.0 gms. water was prepared in a manner similar to Example 1.

This solution was diluted with water to a copper content of .2% and left to stand for a period of two weeks. No precipitation of any copper salt was noted after this time.

Example 4

A liquid concentrate containing 2.0 gms. copper arsenite, 10.0 gms. concentrated $NH_4OH$ (28% $NH_3$), 7.0 gms. $(NH_4)_2SO_4$ and 31.0 gms. water was prepared in a manner similar to that described for Example 1.

This solution was diluted with water to a copper content of .25% and then left standing for a period of over two weeks during which time no apparent precipitation of copper salts occurred.

In order to illustrate the improved stability obtained through the addition of ammonium salts, the following example wherein no ammonium salt was added is also given.

Example 5

A solution containing 3.3 gms. $CuF_2 \cdot 2H_2O$, 6.7 gms. concentrated $NH_4OH$ (28% $NH_3$) and 10.0 gms. water was prepared in the same manner as Example 1.

This solution was then diluted with water to a copper content of .25%; a large proportion of the copper salt precipitated out of solution after standing for only 15 minutes.

The copper deposits obtained through the use of any of the solutions given in the above examples showed excellent resistance to leaching when the impregnated fibers were allowed to stand in water over extended periods of time. Also, the solutions could be diluted to substantially greater degrees than the unstabilized ammoniacal solutions as illustrated by Example 5 without the copper precipitating therefrom either at the time of dilution or after standing over extended periods of time.

In the examples as given, specific ammonium salts are used. The invention is not, however, to be limited to these salts alone since it is believed that any ammonium salt soluble in the copper ammoniacal solution, other than ammonium acid salts such as $NH_4H_2PO_4$, will serve to stabilize the solution as heretofore stated. Among the many salts which are suitable are the following mentioned for illustration: ammonium carbonate, ammonium chloride, ammonium nitrate, ammonium sulfate, ammonium bromide and ammonium iodide.

Having thus described my invention, I claim:

1. A composition consisting essentially of a substantially concentrated aqueous solution of ammonium hydroxide (about 28% $NH_3$) at least one pesticide of the group consisting of copper fluoride, copper arsenate, and copper arsenite, and a stabilizer of the group consisting of ammonium carbonate, ammonium chloride, ammonium nitrate, ammonium sulfate, ammonium bromide and ammonium iodide, these being present in said composition in about 1 part by weight of copper pesticide for each 2 parts by weight concentrated ammonium hydroxide and at least 3 mols of stabilizer for each mol of copper pesticide present.

2. A composition of claim 1 wherein said stabilizer is present in amounts of 3 to 5 mols stabilizer for each mol of copper pesticide present.

3. A composition of claim 1 wherein the copper pesticide is copper fluoride.

4. A composition of claim 1 wherein the copper pesticide is copper arsenate.

5. A composition of claim 1 wherein the copper pesticide is copper arsenite.

6. A composition of claim 1 wherein the stabilizer is ammonium carbonate.

7. A composition of claim 1 wherein the stabilizer is ammonium chloride.

8. A composition of claim 1 wherein the stabilizer is ammonium nitrate.

9. A composition of claim 1 wherein the stabilizer is ammonium sulfate.

10. A composition of claim 1 wherein the stabilizer is ammonium bromide.

References Cited in the file of this patent

UNITED STATES PATENTS

| | | |
|---|---|---|
| 1,589,644 | Hedenburg | June 22, 1926 |
| 2,386,471 | Jones | Oct. 9, 1945 |

FOREIGN PATENTS

| | | |
|---|---|---|
| 553,945 | Britain | June 11, 1943 |
| 490,260 | Germany | Feb. 1, 1930 |